(12) United States Patent
Shinn

(10) Patent No.: US 7,690,176 B2
(45) Date of Patent: Apr. 6, 2010

(54) ROTARY CUTTER DEVICE WITH INTEGRATED COOLING SYSTEM

(76) Inventor: Rickey D. Shinn, 13915 Hastings Farm Rd., Huntersville, NC (US) 28078

( * ) Notice: Subject to any disclaimer, the term of this patent is extended or adjusted under 35 U.S.C. 154(b) by 171 days.

(21) Appl. No.: 11/732,978

(22) Filed: Apr. 5, 2007

(65) Prior Publication Data
US 2008/0245043 A1   Oct. 9, 2008

(51) Int. Cl.
  A01D 69/00  (2006.01)
  A01D 34/42  (2006.01)
(52) U.S. Cl. .................................... 56/11.9; 56/504
(58) Field of Classification Search ............... 56/11.9, 56/16.8, DIG. 11, 500, 501, 504; 241/65, 241/66, 101.77
See application file for complete search history.

(56) References Cited

U.S. PATENT DOCUMENTS

| 2,496,022 | A | * | 1/1950 | Remonte | 310/66 |
| 3,659,419 | A | * | 5/1972 | Ikeda | 60/405 |
| 3,751,191 | A | * | 8/1973 | Mott et al. | 417/313 |
| 3,844,096 | A | * | 10/1974 | Dunn | 56/504 |
| 4,308,713 | A | * | 1/1982 | James | 56/11.9 |
| 4,442,658 | A | * | 4/1984 | Cartner | 56/11.9 |
| 4,495,754 | A | * | 1/1985 | Cartner | 56/11.9 |
| 4,507,909 | A | * | 4/1985 | Kelpin, Sr. | 56/9 |
| 4,542,785 | A | * | 9/1985 | Bagnall et al. | 165/95 |
| 4,607,799 | A | * | 8/1986 | Currie | 241/101.72 |
| 5,666,794 | A | * | 9/1997 | Vought et al. | 56/15.2 |
| 5,678,639 | A | * | 10/1997 | Golden | 172/52 |
| 5,692,689 | A | * | 12/1997 | Shinn | 241/101.72 |
| 5,775,073 | A | * | 7/1998 | Kelpin et al. | 56/8 |
| 5,802,745 | A | * | 9/1998 | Haseotes et al. | 37/234 |
| 6,105,660 | A | * | 8/2000 | Knurr | 165/41 |
| 6,237,695 | B1 | * | 5/2001 | Pierce et al. | 172/79 |
| 6,321,518 | B1 | * | 11/2001 | O'Hagan | 56/294 |
| 6,435,234 | B1 | * | 8/2002 | Paumier | 144/24.12 |
| 6,826,895 | B2 | * | 12/2004 | Iida et al. | 56/11.9 |
| 6,871,485 | B2 | * | 3/2005 | Schafer | 56/249 |
| 7,222,808 | B2 | * | 5/2007 | Edwards | 241/294 |
| 2003/0188902 | A1 | * | 10/2003 | Decuir | 180/68.3 |
| 2007/0199293 | A1 | * | 8/2007 | Barnett | 56/11.9 |
| 2008/0000208 | A1 | * | 1/2008 | Edwards | 56/7 |
| 2008/0245043 | A1 | * | 10/2008 | Shinn | 56/11.9 |

* cited by examiner

Primary Examiner—Thomas B Will
Assistant Examiner—Joan D Misa
(74) Attorney, Agent, or Firm—Schwartz Law Firm, P.C.

(57) ABSTRACT

A hydraulic cutter device incorporates a rotatable base including a plurality of spaced cutter teeth. A protective shield covers at least a portion of the base. A fluid cooler is located adjacent the protective shield, and defines a window for movement of ambient air from a relatively high-pressure area upstream of the fluid cooler to a relatively low-pressure area downstream of the fluid cooler. A hydraulic motor is adapted for rotating the base, and includes a plurality of hydraulic lines communicating with the fluid cooler. Rotation of the base creates a pressure reduction downstream of the fluid cooler causing ambient air flow into and through the fluid cooler to cool fluid moving into and from the hydraulic motor.

17 Claims, 6 Drawing Sheets

ROTARY CUTTER DEVICE WITH INTEGRATED COOLING SYSTEM

TECHNICAL FIELD AND BACKGROUND

The invention relates generally to a rotary cutter device with an integrated cooling system. In one exemplary implementation, the invention is coupled to a self-propelled vehicle, such as a loader or backhoe. The broad concept of the invention is applicable to any other construction machine or equipment.

SUMMARY OF EXEMPLARY EMBODIMENTS

Therefore, it is an object of the invention to provide a rotary cutter device with an integrated cooling system. In one exemplary embodiment, the cooling system is incorporated directly within a protective shield of the cutter device. In other embodiments, the cooling system may be located proximate any other structural component of the cutter device.

These and other objects of the present invention are achieved in the exemplary embodiments disclosed below by providing a hydraulic cutter device incorporating a rotatable base, a protective shield (or housing), a fluid cooler, and a hydraulic motor. The rotatable base includes a plurality of spaced cutter teeth. The protective shield covers at least a portion of the base. The fluid cooler is located adjacent the protective shield, and defines a window for movement of ambient air from a relatively high-pressure area upstream of the fluid cooler to a relatively low-pressure area downstream of the fluid cooler. The hydraulic motor is adapted for rotating the base, and includes a plurality of hydraulic lines communicating with the fluid cooler.

Rotation of the base creates a pressure reduction downstream of the fluid cooler causing ambient air flow into and through the fluid cooler to cool fluid moving into and from the hydraulic motor.

The term "hydraulic motor" refers broadly herein to any motor, actuator, or other mechanism which converts the kinetic or potential energy of a fluid into mechanical energy. The fluid may comprise mineral oil, petroleum oil, synthetic oil, bio oil, or other fluid.

The term "fluid cooler" refers broadly to any heat exchanger or other device which transfers the heat of one substance to another.

According to another exemplary embodiment of the invention, a cooler housing is mounted on an outside surface of the protective shield and cooperates with the shield to form a substantially enclosed air chamber therebetween. The air chamber has an inlet communicating with the fluid cooler, and an outlet downstream of the fluid cooler and communicating with an interior of the protective shield.

According to another exemplary embodiment of the invention, the outlet of the air chamber comprises a plurality of slotted vents formed with the protective shield downstream of the fluid cooler.

According to another exemplary embodiment of the invention, a deflector plate is attached to an inside surface of the protective shield upstream of the outlet. The deflector plate extends inwardly towards the cutter teeth of the base.

In another exemplary embodiment, the invention may comprise a hydraulic cutter device incorporating a rotatable cylindrical cutter drum including a plurality of circumferentially-spaced cutter teeth. A protective shield covers at least a portion of the cutter drum. A fanless fluid cooler is located adjacent the protective shield, and defines a window for movement of ambient air from a relatively high-pressure area upstream of the fluid cooler to a relatively low-pressure area downstream of the fluid cooler. A hydraulic motor is adapted for rotating the cutter drum, and includes a plurality of hydraulic lines communicating with the fluid cooler. Rotation of the cutter drum creates a pressure reduction downstream of the fluid cooler causing ambient air flow into and through the fluid cooler to cool fluid moving into and from the hydraulic motor.

According to another exemplary embodiment of the invention, the protective shield has a length dimension substantially equal to a length dimension of the rotatable cutter drum.

According to another exemplary embodiment of the invention, the cooler housing has a length dimension substantially equal to a length dimension of the protective shield.

According to another exemplary embodiment of the invention, the outlet of the air chamber comprises a plurality of longitudinally-spaced slotted vents formed with the protective shield downstream of the fluid cooler. The slotted vents are arranged from one end of the protective shield to an opposite end of the protective shield.

In yet another exemplary embodiment, the invention may comprise the combination of a vehicle and a hydraulic cutter device, such as that described herein. The cutter device may be coupled to an adjustable arm of the vehicle. The vehicle may be self-propelled, and may comprise a self-propelled loader. The term "self-propelled" refers broadly to a vehicle which is propelled by its own engine, motor, or the like, rather than drawn or pushed entirely by something else.

BRIEF DESCRIPTION OF THE DRAWINGS

Some of the objects of the invention have been set forth above. Other objects and advantages of the invention will appear as the description proceeds when taken in conjunction with the following drawings, in which.

DESCRIPTION OF EXEMPLARY EMBODIMENTS AND BEST MODE

The present invention is described more fully hereinafter with reference to the accompanying drawings, in which one or more exemplary embodiments of the invention are shown. This invention may, however, be embodied in many different forms and should not be construed as limited to the embodiments set forth herein; rather, these embodiments are provided so that this disclosure will be operative, enabling, and complete. Like numbers refer to like elements throughout. As used herein, the article "a" is intended to include one or more items. Where only one item is intended, the term "one" or similar language is used. Although specific terms are employed herein, they are used in a generic and descriptive sense only and not for purposes of limitation. Unless otherwise expressly defined herein, such terms are intended to be given their broad ordinary and customary meaning not inconsistent with that applicable in the relevant industry and without restriction to any specific embodiment hereinafter described. Any references to advantages, benefits, unexpected results, or operability of the present invention are not intended as an affirmation that the invention has been previously reduced to practice or that any testing has been performed.

Figure 1:
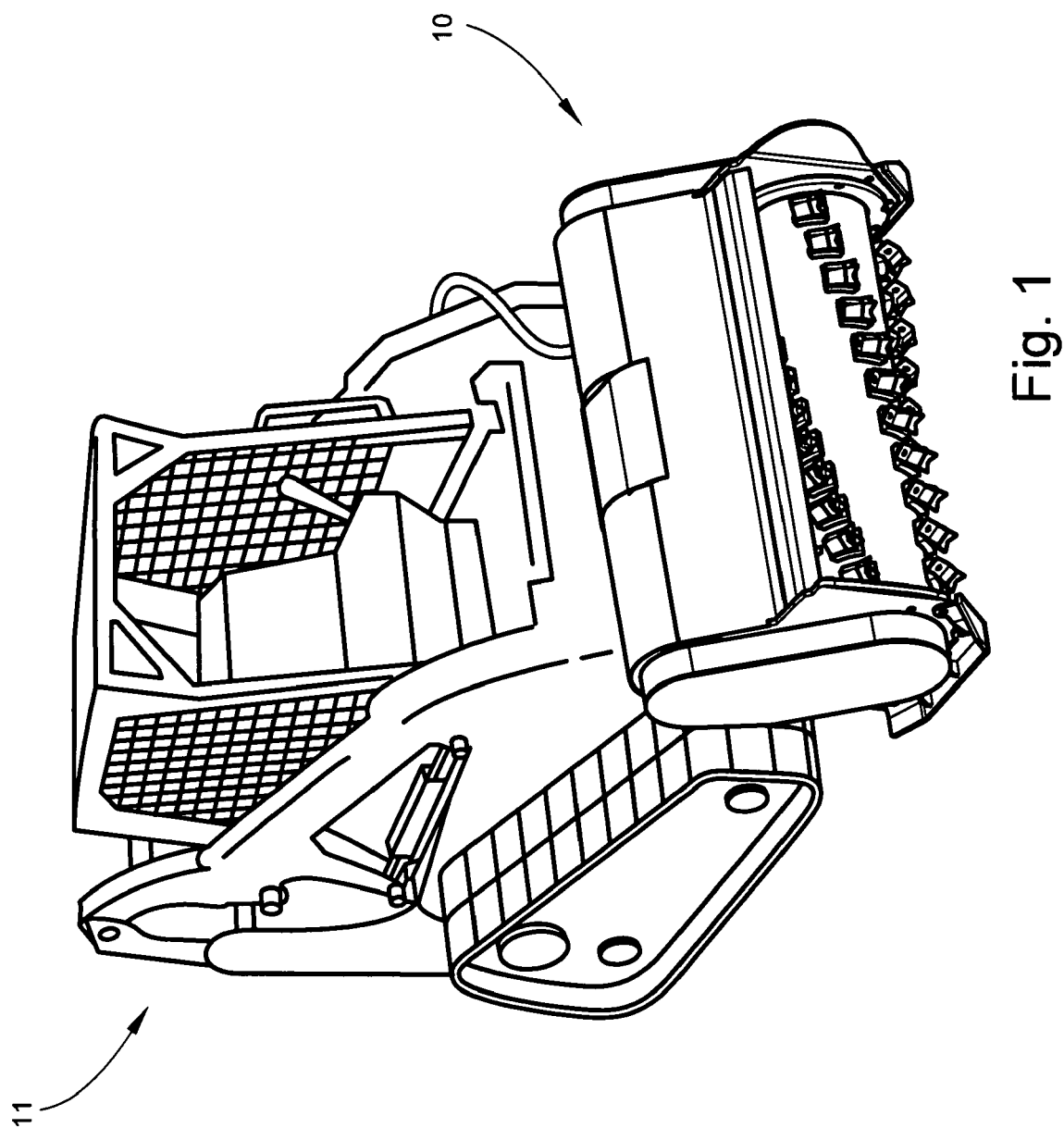
FIG. 1 is a perspective view of construction loader with a hydraulic cutter device incorporating a cooling system according to one exemplary embodiment of the present invention.
Figure 2:
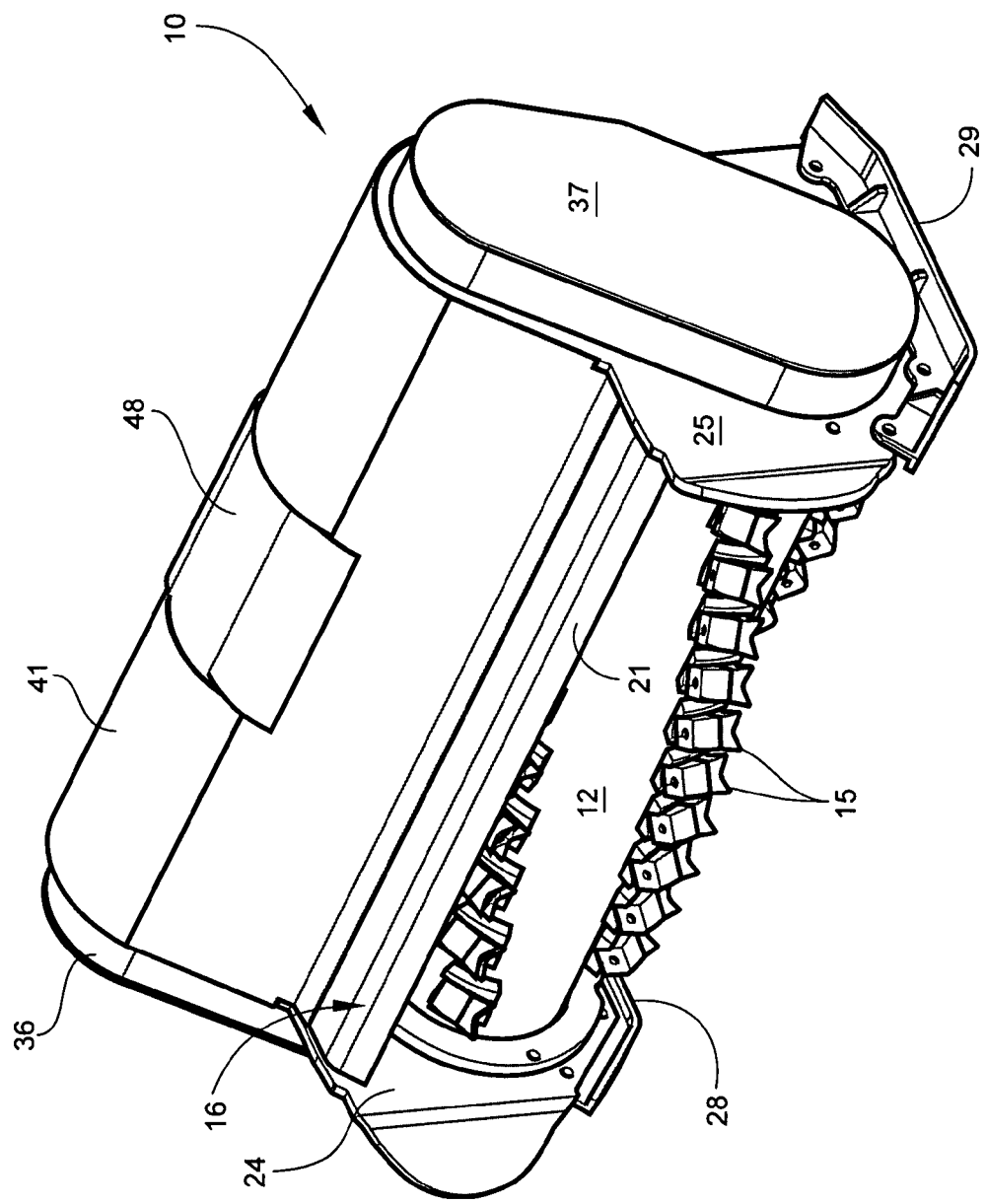
FIG. 2 is a front perspective view of the cutter device detached from the loader.
Figure 3:
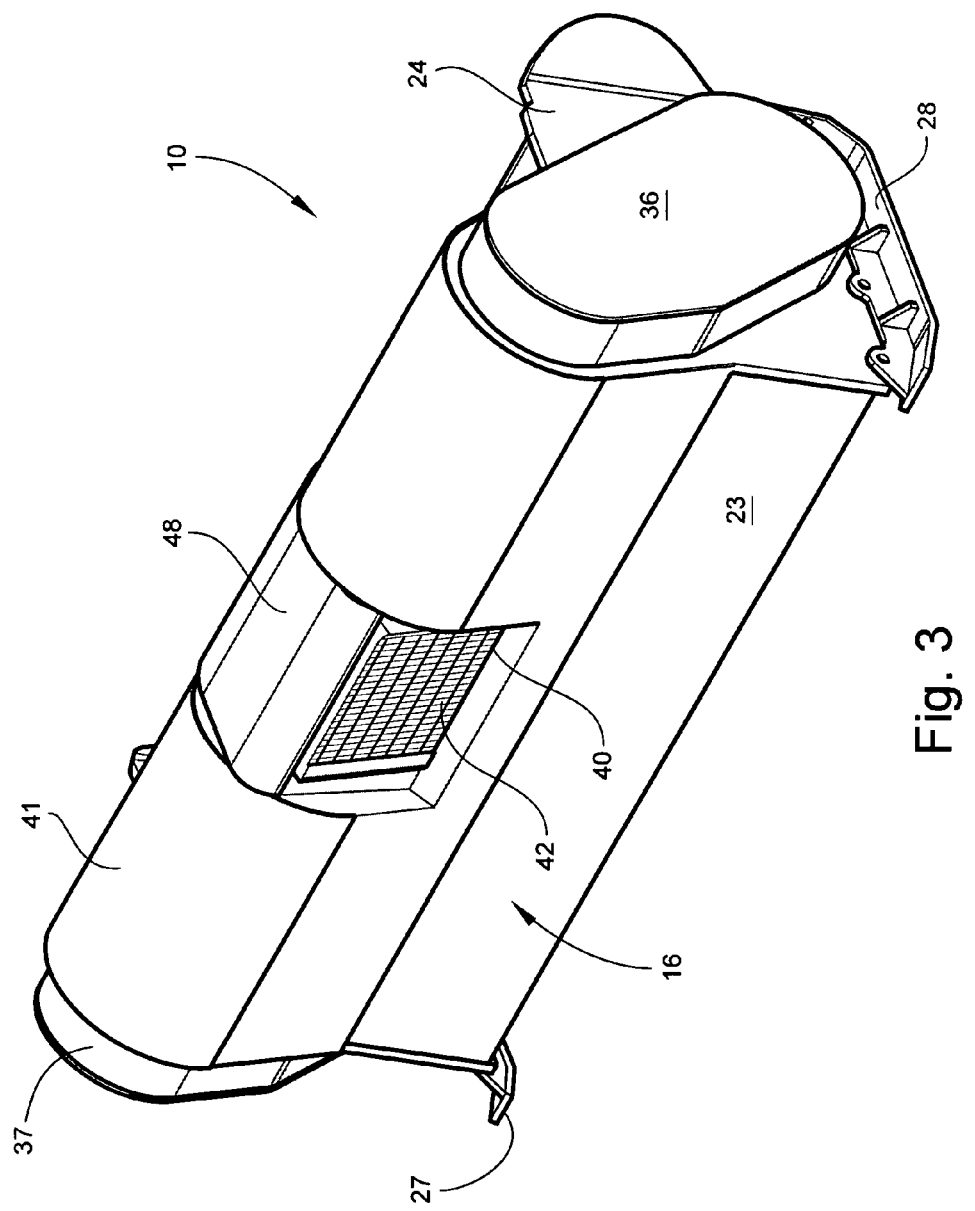
FIG. 3 is a rear perspective view of the cutter device detached from the loader.

Referring now specifically to the drawings, a hydraulic cutter device according to the present invention is illustrated in FIGS. 1-3, and shown generally at reference numeral 10. In one exemplary implementation, the cutter device 10 includes a standard interface linkage (not shown), and is adapted for attachment by means, such as a quick coupler, to a self-propelled vehicle 11, such as the skid steer loader shown in FIG. 1. In operation, the cutter device 10 is particularly applicable for clearing land, cutting, grinding and mulching trees, brush and debris, digging and grubbing. In other implementations, the present concept may be incorporated in any mobile or stationary wood and brush chippers, stone crushers, stump grinders, and other construction equipment and machinery.

Figure 4:
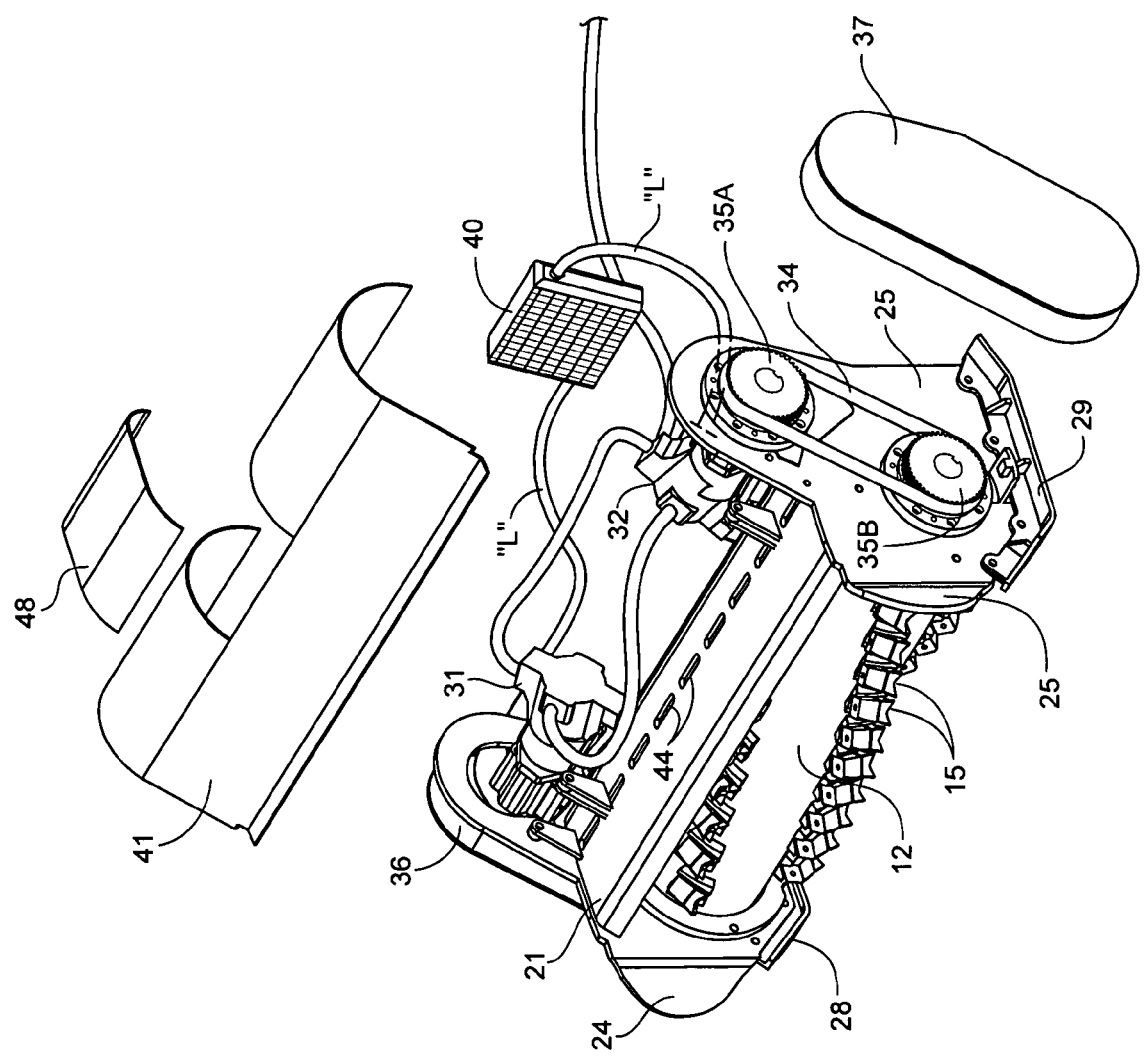
FIG. 4 is a further perspective view of the cutter device with various components exploded away.
Figure 5:
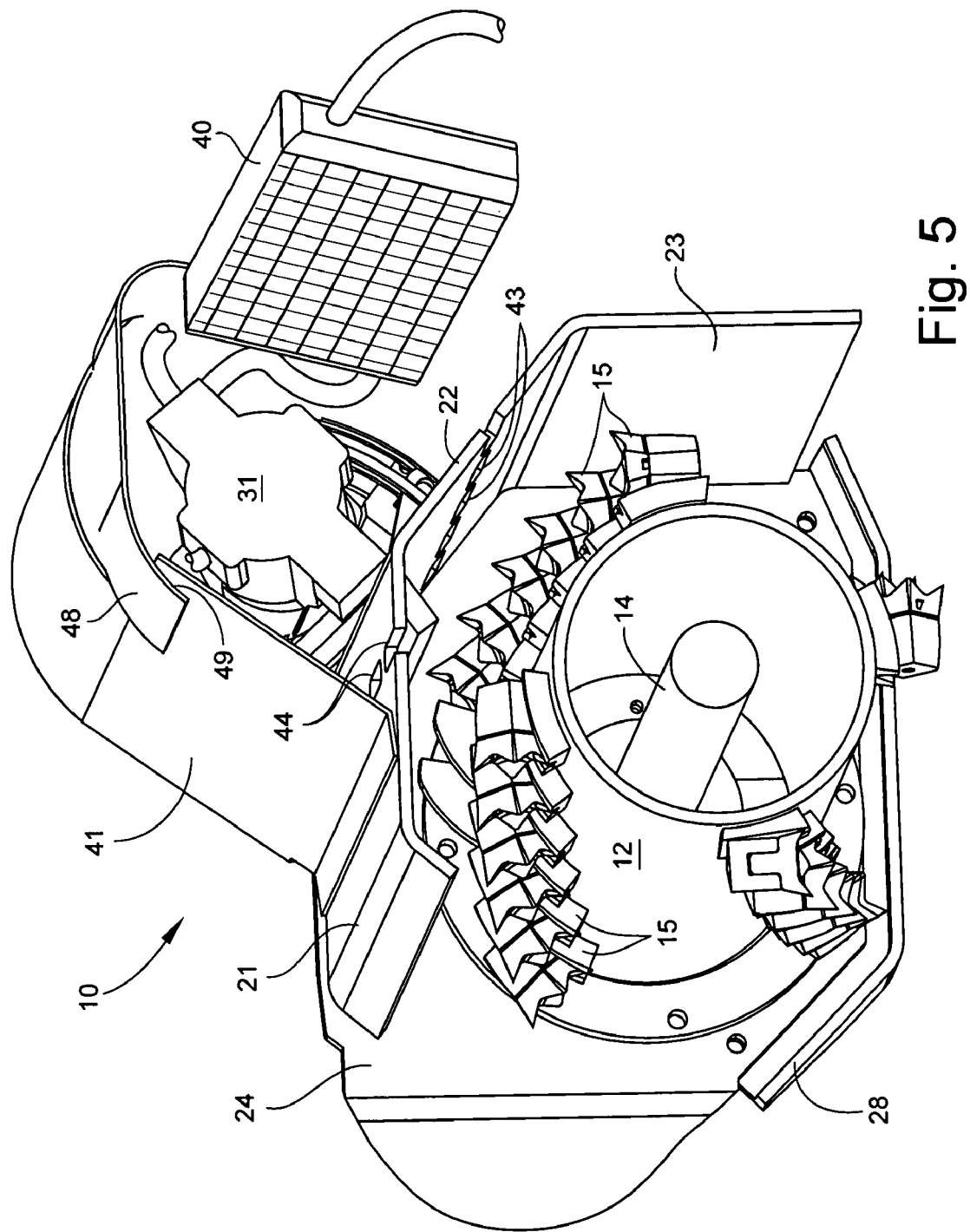
FIG. 5 is a cross-sectional view of the cutter device.
Figure 6:
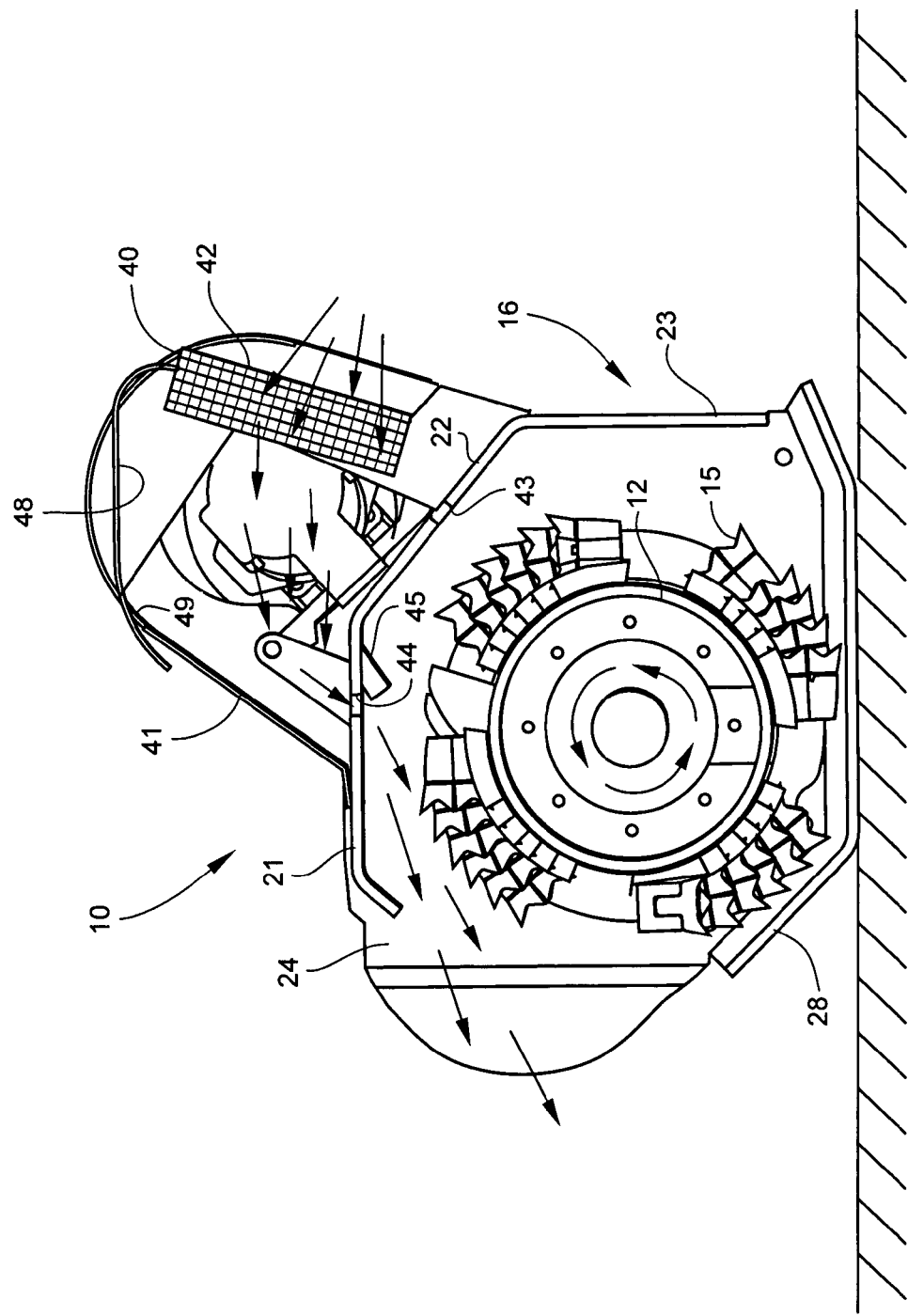
FIG. 6 is a further cross-sectional view demonstrating operation of the cutter device and cooling system.

As best shown in FIGS. 4, 5, and 6, the cutter device 10 comprises a cylindrical drum 12 carried on an elongated rotatable drive shaft 14, and including a number of outward-extending cutter teeth 15. Examples of cutter teeth applicable in the present device 10 are provided in Applicant's prior U.S. Pat. Nos. 5,873,534 and 6,176,445, incorporated herein by reference. The cutter drum 12 is located beneath a protective shield 16 designed to substantially cover a vehicle-side portion of the drum 12. The shield 16 may comprise integrally-formed front wall 21, center wall 22, back wall 23 and side walls 24, 25 which cooperate to control debris deflection outwardly from the cutter device 10 during operation. To promote maneuverability, conventional skids 28, 29 may be attached to respective side walls 24, 25. The side walls 24, 25 may also be extended and flared at respective front ends for added debris control and safety.

The drum 12 is actuated by hydraulic motors 31 and 32 mounted outside of the protective shield 16, and operatively connected at opposite ends of the drive shaft 14 through respective cooperating pairs of belts 34 and sprockets 35A, 35B (only one pair shown). The belts 34 and sprockets 35A, 35B are substantially encased within respective end caps 36 and 37 located at opposite ends of the drum 12 and attached to the protective shield 16. According to one exemplary embodiment, the drum 12 is roughly 24 inches in diameter and rotates at between 850-1800 rpm. The hydraulic motors 31, 32 have intake and return lines "L" operating in a conventional manner to convert fluid energy into mechanical energy sufficient to rotate the drive shaft 14 and cutter drum 12 at high speeds. Generally speaking, high pressure hydraulic fluid is transmitted from a reservoir throughout the vehicle 11 to various hydraulic motors and hydraulic cylinders. The fluid is controlled directly or automatically by control valves and distributed through hoses and tubes. In one implementation, the cutter device 10 utilizes axial piston hydraulic motors having an optimal flow range of 125-137 L/min, and an optimal pressure range of 195-350 bar. Detailed operation of hydraulic motors in construction machines and equipment is well known in the art, and will not be further described herein.

In order to cool the hydraulic fluid during operation of the cutter device 10, the return lines "L" are connected to an oil cooler 40 (or heat-exchanger). The oil cooler 40 is encased within a cooler housing 41 mounted to an outside surface of the protective shield 16, and cooperating with the shield 16 to form a substantially enclosed air chamber. The air chamber has an inlet window defined by a major surface 42 the cooler 40, and an outlet formed by first and second rows of longitudinally-spaced slotted vents 43 and 44. The vents 43, 44 are formed with the front and center walls 21, 22, respectively, of the protective shield 16. In one implementation, the vents 43, 44 may extend from one end of the protective shield 16 to the other. As best shown in FIG. 6, a debris deflection baffle 45 may be attached to an inside surface of the protective shield 16 between the first and second rows of slotted vents 43, 44. In the embodiment shown, the baffle 45 extends longitudinally along substantially the entire length of the shield 16, and projects from the front wall 21 at an angle of approximately 120 degrees to the direction of drum rotation and debris flow.

Referring to FIGS. 2-6, the oil cooler 40 is secured along its side and bottom edges to the cooler housing 41 by welding, brackets, or other means. A separate rooflike structure 48 may extend from a top edge of the oil cooler 40 to the front the housing 41 and slightly beyond, and may form a narrow opening 49 in the cooler housing 41 to adjust pressure inside the air chamber during operation of the cutter device 10. According to one exemplary embodiment, the oil cooler 40 is a fanless, motorless cooler such as that manufactured by AKG Thermotechnik International GmbH & Co. of Germany.

During high speed rotation of the cutter drum 12 (in a direction away from the operator), air flow up to 100-135 cfm is drawn inside and through the protective shield 16. As air moves along an inside surface of the shield 16 and across the slotted vents 43, 44, the resulting pressure difference inside the air chamber accelerates the pull of ambient air into the cooler housing 41 through the oil cooler 40. FIG. 6 demonstrates the intake and flow of ambient air through the oil cooler 40, through the slotted vents 44, and outwardly from inside the protective shield 16. Air flow through the oil cooler 40 operates to cool the high pressure fluid moving into and from the hydraulic motors 31, 32. The oil cooler may have a working pressure of about 14 bar, and heat rejection (dissipation) figures in the range of 8-16 kW at 30 degrees C. ambient temperature.

Exemplary embodiments of the present invention are described above. No element, act, or instruction used in this description should be construed as critical or essential to the invention unless explicitly described as such. Various details of the invention may be changed without departing from its scope. Furthermore, the foregoing description of the exemplary embodiments of the invention and best mode for practicing the invention are provided for the purpose of illustration only and not for the purpose of limitation—the invention being defined by the claims and their equivalents.

I claim:

1. A hydraulic cutter device, comprising:
   a rotatable base including a plurality of spaced cutter teeth;
   a protective shield covering at least a portion of said base;
   a cooler housing located outside of said protective shield and cooperating with said shield to form a substantially enclosed air chamber therebetween;
   a fluid cooler located within said cooler housing adjacent said protective shield, and defining a window for movement of ambient air therethrough;
   said air chamber having an inlet designed for directing airflow through the window of said fluid cooler, and an outlet downstream of said fluid cooler and communicating with an interior of said protective shield, wherein the outlet of said air chamber comprises at least one slotted vent formed with said protective shield; and
   a hydraulic motor adapted for rotating said base, and comprising a plurality of hydraulic lines communicating with said fluid cooler; and whereby, rotation of said base causes ambient air flow into and through said fluid cooler to cool fluid moving into and from said hydraulic motor.

2. A hydraulic cutter device according to claim 1, wherein the outlet of said air chamber comprises a plurality of slotted vents formed with said protective shield downstream of said fluid cooler.

3. A hydraulic cutter device according to claim 1, and comprising a deflector plate attached to an inside surface of said protective shield upstream of said outlet, and extending inwardly towards the cutter teeth of said base.

4. A hydraulic cutter device, comprising:
 a rotatable cylindrical cutter drum including a plurality of circumferentially-spaced cutter teeth;
 a protective shield covering at least a portion of said cutter drum;
 a cooler housing located outside of said protective shield and cooperating with said shield to form a substantially enclosed air chamber therebetween;
 a fanless fluid cooler located within said cooler housing adjacent said protective shield, and defining a window for movement of ambient air therethrough;
 said air chamber having an inlet designed for directing ambient air flow through the window of said fluid cooler, and an outlet downstream of said fluid cooler and communicating with an interior of said protective shield, wherein the outlet of said air chamber comprises at least one slotted vent formed with said protective shield; and
 a hydraulic motor adapted for rotating said cutter drum, and comprising a plurality of hydraulic lines communicating with said fluid cooler; and
 whereby, rotation of said cutter drum causes ambient air flow into and through said fluid cooler to cool fluid moving into and from said hydraulic motor.

5. A hydraulic cutter device according to claim 4, and comprising a deflector plate attached to an inside surface of said protective shield upstream of said outlet, and extending inwardly towards the cutter teeth of said base.

6. A hydraulic cutter device according to claim 5, wherein the outlet of said air chamber comprises a plurality of slotted vents formed with said protective shield downstream of said fluid cooler.

7. A hydraulic cutter device according to claim 6, wherein said protective shield has a length dimension substantially equal to a length dimension of said rotatable cutter drum.

8. A hydraulic cutter device according to claim 7, wherein said cooler housing has a length dimension substantially equal to a length dimension of said protective shield.

9. A hydraulic cutter device according to claim 8, wherein the outlet of said air chamber comprises a plurality of longitudinally-spaced slotted vents formed with said protective shield downstream of said fluid cooler, and arranged from one end of said protective shield to an opposite end of said protective shield.

10. In combination with a vehicle, a hydraulic cutter device comprising:
 a rotatable cylindrical cutter drum including a plurality of circumferentially-spaced cutter teeth;
 a protective shield covering at least a portion of said cutter drum;
 a cooler housing located outside of said protective shield and cooperating with said shield to form a substantially enclosed air chamber therebetween;
 a fanless fluid cooler located within said cooler housing adjacent said protective shield, and defining a window for movement of ambient air therethrough;
 said air chamber having an inlet designed for directing ambient air flow through the window of said fluid cooler, and an outlet downstream of said fluid cooler and communicating with an interior of said protective shield, wherein the outlet of said air chamber comprises at least one slotted vent formed with said protective shield; and
 a hydraulic motor adapted for rotating said cutter drum, and comprising a plurality of hydraulic lines communicating with said fluid cooler; and
 whereby, rotation of said cutter drum causes ambient air flow into and through said fluid cooler to cool fluid moving into and from said hydraulic motor.

11. A combination according to claim 10, and comprising a deflector plate attached to an inside surface of said protective shield upstream of said outlet, and extending inwardly towards the cutter teeth of said base.

12. A combination according to claim 11, wherein the outlet of said air chamber comprises a plurality of slotted vents formed with said protective shield downstream of said fluid cooler.

13. A combination according to claim 12, wherein said protective shield has a length dimension substantially equal to a length dimension of said rotatable cutter drum.

14. A combination according to claim 13, wherein said cooler housing has a length dimension substantially equal to a length dimension of said protective shield.

15. A combination according to claim 14, wherein the outlet of said air chamber comprises a plurality of longitudinally-spaced slotted vents formed with said protective shield downstream of said fluid cooler, and arranged from one end of said protective shield to an opposite end of said protective shield.

16. A combination according to claim 10, wherein said cutter device is mounted on an adjustable arm of said vehicle.

17. A combination according to claim 10, wherein said vehicle comprises a self-propelled loader.

\* \* \* \* \*